Jan. 31, 1928.
H. W. BARSON
1,657,814
VENDING MACHINE
Filed Jan. 11, 1927     5 Sheets-Sheet 4
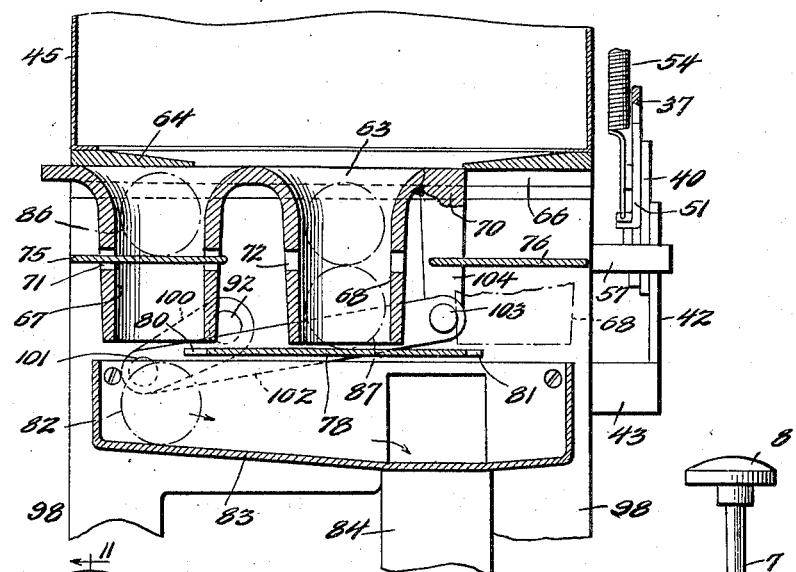
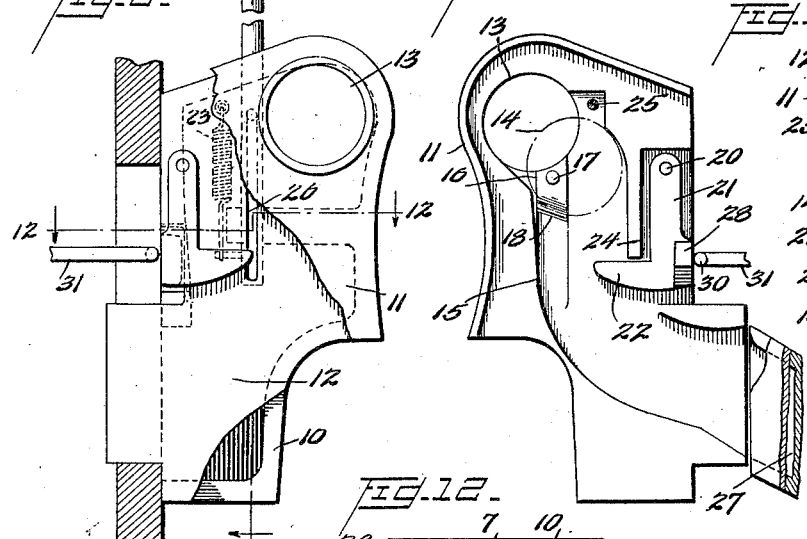
Inventor
Harry W. Barson
By
Attorney Jan. 31, 1928.
H. W. BARSON
1,657,814
VENDING MACHINE
Filed Jan. 11, 1927
5 Sheets-Sheet 5
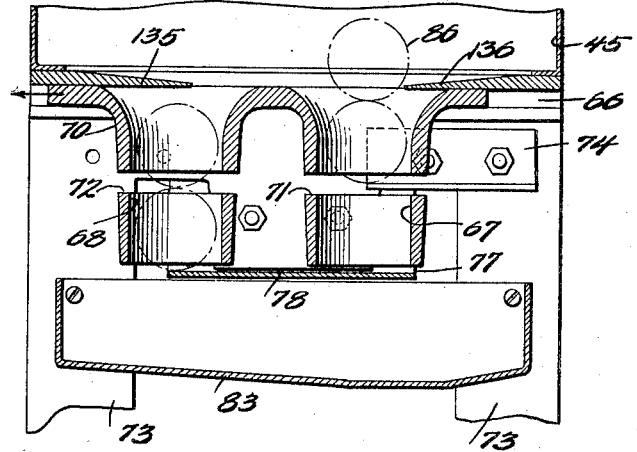
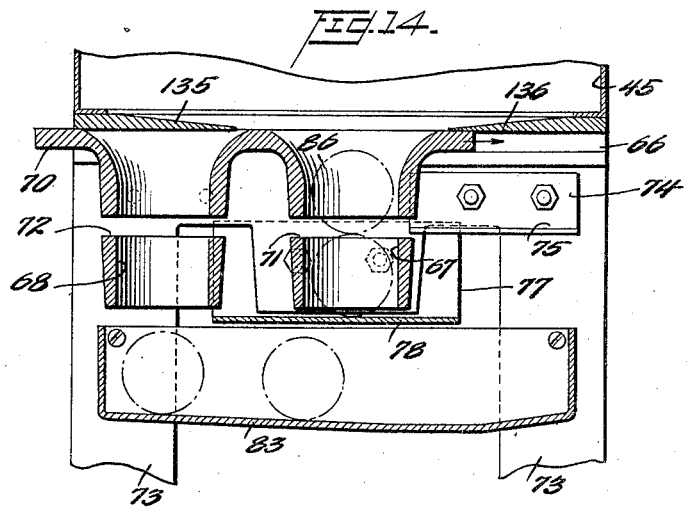
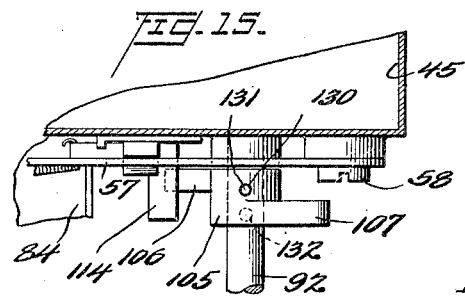
Inventor
Harry W. Barson
By
Attorney Patented Jan. 31, 1928.

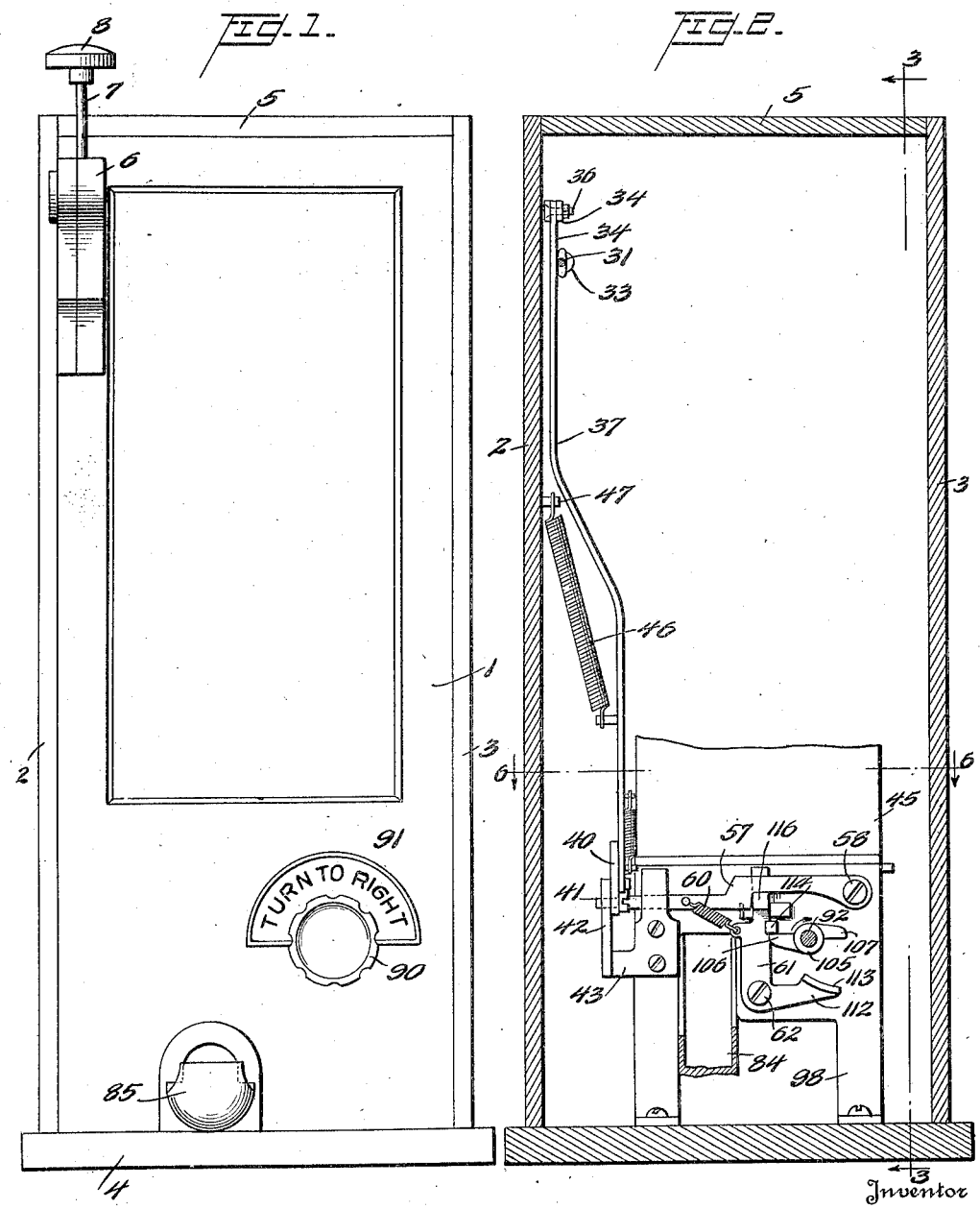

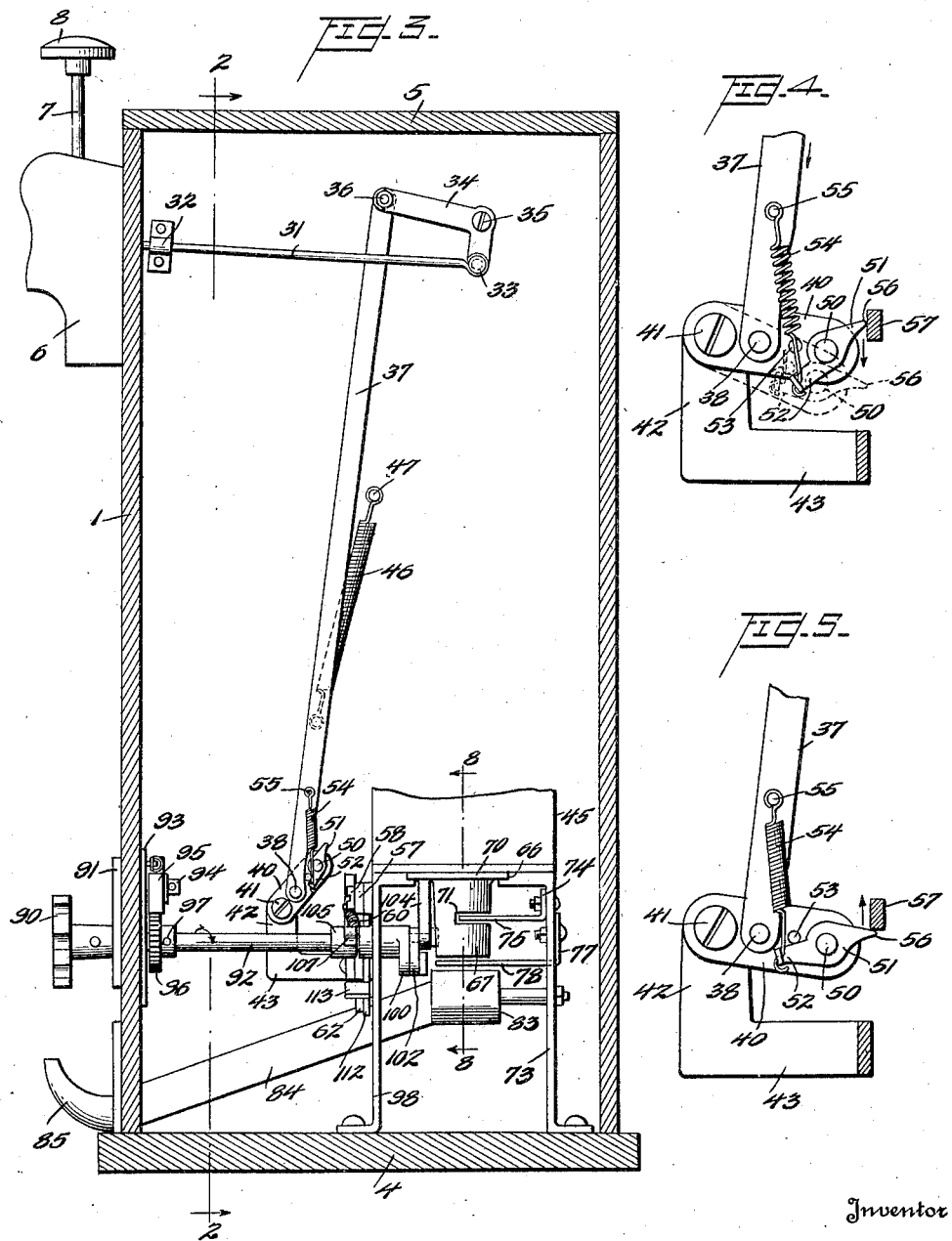

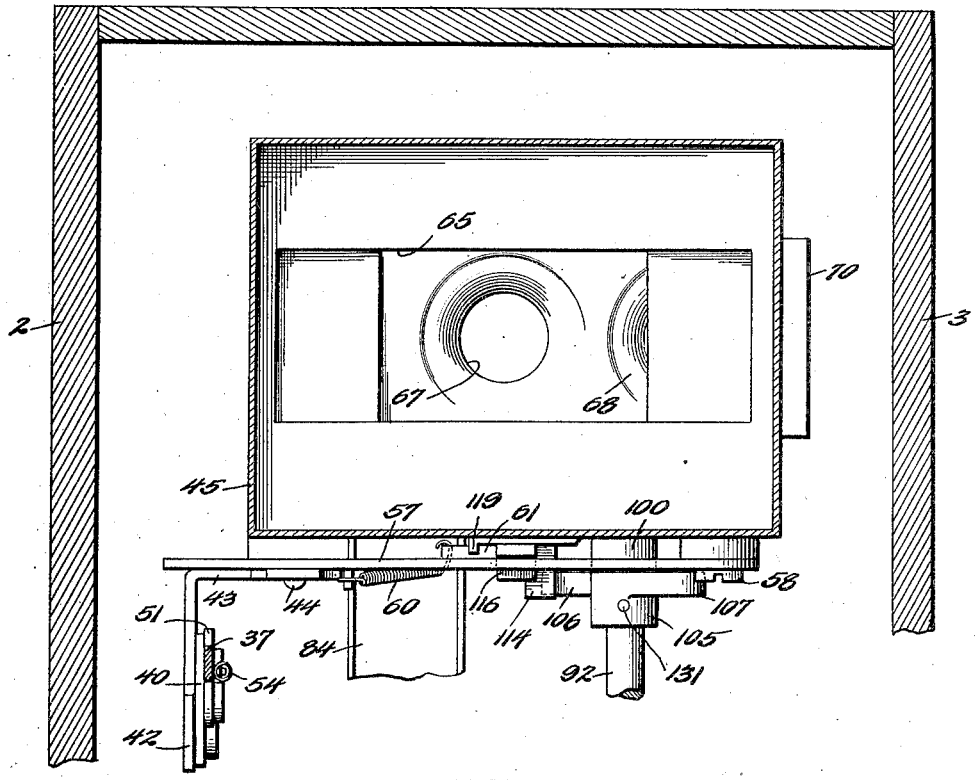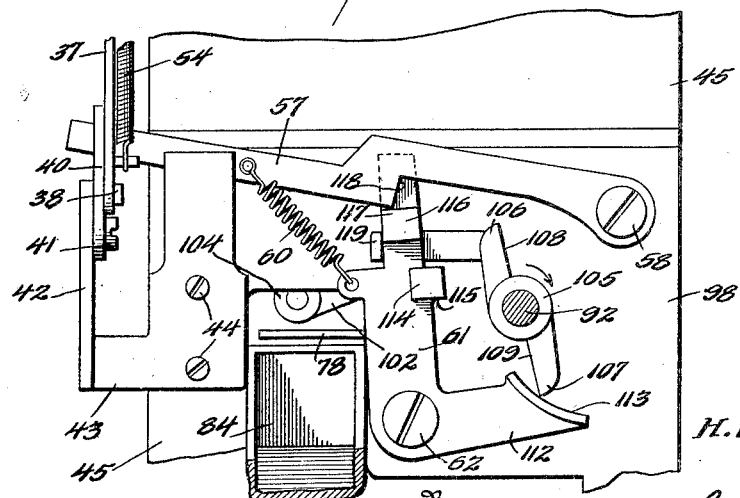

1,657,814

UNITED STATES PATENT OFFICE.

HARRY W. BARSON, OF CHICAGO, ILLINOIS, ASSIGNOR TO ODE D. JENNINGS, OF CHICAGO, ILLINOIS.

VENDING MACHINE.

Application filed January 11, 1927. Serial No. 160,491.

This invention relates to coin controlled vending machines and has for its object to provide a mechanism which may be adjusted to discharge varying and different numbers of articles of merchandise for a single coin inserted therein, as well as to provide a device simple in construction and more efficient in operation than those heretofore proposed.

With these and other objects in view the construction and arrangements of parts more fully hereinafter disclosed and particularly pointed out in the claims.

Referring to the accompanying drawings forming a part of this specification in which like numerals designate like parts in all the views;

Fig. 1 is a front elevational view of a device made in accordance with this invention;

Fig. 2 is a transverse sectional view taken as on the line 2—2 of Fig. 3 and looking in the direction of the arrows;

Fig. 3 is a sectional view taken as on the line 3—3 of Fig. 2 and looking in the direction of the arrows;

Fig. 4 is a detail view illustrating the coin actuated trip member in one position;

Fig. 5 is a view similar to Fig. 4 showing the trip member in a different position;

Fig. 6 is a horizontal sectional view taken as on the line 6—6 of Fig. 2 and looking in the direction of the arrows;

Fig. 7 is a side elevational view of the merchandise releasing mechanism;

Fig. 8 is a vertical sectional view of the merchandise releasing mechanism, taken as on the line 8—8 of Fig. 3 and looking in the direction of the arrows;

Fig. 9 is a view of the coin controlling plunger and associated mechanism, partly in section;

Fig. 10 is a sectional view of the coin releasing mechanism taken as on the line 10—10 of Fig. 11 and looking in the direction of the arrows;

Fig. 11 is a vertical sectional view of the coin releasing mechanism taken as on the line 11—11 of Fig. 9 and looking in the direction of the arrows;

Fig. 12 is a horizontal sectional view of the parts illustrated in Figs. 9, 10 and 11 taken as on the line 12—12 of Fig. 9 and looking in the direction of the arrows;

Fig. 13 is a vertical sectional view similar to Fig. 8 but showing the measuring member adapted for the discharge of a different number of articles of merchandise;

Fig. 14 is a view similar to Fig. 13 showing the parts in a different position; and Fig. 15 is a detail top plan view of a modified form of trip member 105.

The vending machine comprises a cabinet consisting of the front wall 1, the side walls 2 and 3, the bottom 4 and a cover 5. Secured to the front wall 1 and extending outwardly therefrom is a housing generally indicated by the numeral 6 which contains the coin controlling mechanism actuated by a plunger 7 having at its uppermost end the handle or knob 8. With particular reference to Fig. 12 it will be observed that the housing 6 consists of a casting 10, forming the rear portion thereof, and a second casting 11, forming the front portion, secured together in any suitable manner. Between the front and rear portions is disposed an intermediate plate portion 12 assisting in the mechanical construction and operation of the coin controlling mechanism, said plate being secured in position by fitting in suitable recesses in the front and rear portions of the housing 6.

The front 11 of the housing 6 is provided with the aperture 13 through which the operating coin may be inserted, such a coin being represented by the dotted circle 14 in Fig. 10. It will be seen that upon insertion of the coin, the same will drop downwardly in the groove 15 provided therefor in the front plate 11, until the advancing edge of said coin is stopped by wedging contact with a flat spring 16 secured as at 17 in a recessed portion of the said cover plate 11, said spring being provided with a free end 18 turned outwardly into the slot 15 to lie in the path of the coin. The purpose of this spring 16 is to prevent a coin, once inserted, from being withdrawn by the operator of the machine in a fraudulent attempt to successively operate the vending mechanism with the same coin. In other words, the vending mechanism is intended to operate only once for a single coin, but without the non-return spring 16, a coin with a string or wire attached thereto might be inserted and then withdrawn upwardly in the coin slot 15 after operating the mechanism, to be again used for subsequent and successive operations of said mechanism. The forward protruding edge 18 of the non-return spring 16 is located a sufficient distance down in the slot 15 so that a coin, withdrawn upwardly in said slot will be stopped by said edge 18 before the coin will permit the vending mechanism to be reset and subsequently operated with the same coin.

Pivoted to the front plate 11 as at 20 is a lever 21 extending downwardly as clearly shown in Fig. 10 and provided at its lowermost end with an angular projection 22 extending into the coin slot 15 and adapted to be moved by the inserted coin so as to operate about said pivot 20 to move to the right as seen in said figure. With particular reference to Figs. 9, 10 and 12 it will be seen that this lever 21 is normally disposed in a substantially vertical position due to the approximate balance of the lever, so that said angular extension will normally lie in the coin slot 15. A shoulder formed by a rib 24 on the front plate 11 prevents movement of the end of the extension 22 too far into the coin slot.

The plunger 7 which operates through suitable guides therefor provided in the housing 6 and its associated plate, is normally retained in raised position by the coil spring 23 and has rigidly secured thereto a laterally extending operating pin 25 of sufficient length to not only pass through an elongated guide slot 26 provided therefor in the intermediate plate 12 but to extend across the narrow dimension of the coin slot 15 so that said pin will, upon the depression of the plunger 7, contact with and move the inserted coin past the non-return spring 16 and the end of the extension 22 of the lever 21, causing the latter to oscillate about its pivot 20, all as will be clear from Figs. 9 to 12 inclusive. The coin 14, after passing the lever 21 is free to continue its travel in the coin slot 15 and enter the coin chute 27 leading to any suitable coin collecting box, not shown, located within the cabinet of the device.

Thus it will be seen from the foregoing description that, after the insertion of a coin 14 and the subsequent depression of the plunger 7, the coin will be forced downwardly in the coin slot 15 to oscillate the lever 21 about its pivot 20, during which movement a laterally extending lug 28 carried at the rear of the end of the extension 22, will contact with the end 30 of the rod 31 actuating the trip device of the vending mechanism, the lever 21 moving outwardly with respect to the housing 6 through a suitable cut-away portion thereof.

The rod 31 works through a suitable guide 32 therefor secured to the side wall 2 of the cabinet, and has its free end pivoted as at 33 to one end of a bell crank lever 34 pivoted as at 35 likewise to the side wall 2 of the cabinet. The other end of the lever 34 is pivoted as at 36 to the upper end of a connecting link 37 the lower end of which is pivoted as at 38 to the mid-portion of a trip lever 40 pivoted as at 41 to an arm 42 of a bracket 43 secured as at 44 to the side of the merchandise bin 45. The connecting link 37, at an intermediate point thereof, has secured thereto a heavy duty coil spring 46 the other end of which is secured as at 47 to the side wall 2 of the cabinet, so that the link 37 will normally rest in a raised position with the end 30 of the rod 31 at all times in contact with the lug 28 of the lever 21 actuated by the coin 14.

The trip lever 40 has freely pivoted to its other end, as at 50, a dog 51 the heel 52 of which is adapted to contact with a stop pin 53 when moved thereagainst by action of the coil spring 54 interposed between said heel and a pin 55 carried by the connecting link 37, see Fig. 5. The toe 56 of the dog is adapted to contact with the free end of the locking lever 57 pivoted as at 58 to the wall of the merchandise bin 45. This locking lever 57 is controlled as by a coil spring 60 interposed between said lever and a releasing lever 61 as clearly shown in Fig. 7, the latter being pivoted as at 62 likewise to the wall of the merchandise bin 45 or a bracket supporting the same. With particular reference to Figs. 2, 3, 4, 5, and 7 it will thus be seen that upon actuation of the plunger 7 after the insertion of a coin, the operating rod 31 is moved to cause a downward movement of the connecting link 37 and the trip lever 40, so that the toe of the dog 51 carried by said trip lever will swipe past the free end of the locking lever 57, the toe 56 of said dog in this movement and upon contact with said locking lever, causing an oscillation of the dog about its pivot against the tension of the spring 54 until said toe 56 has passed the end of said locking lever 57, whereupon the spring 54 will cause a reverse oscillation of the dog 51 leaving the toe 56 of said dog lying beneath the locking lever 57, all as will be clear from Figs. 4 and 5. Upon release of the plunger 7, the heavy duty spring 46 will move the link 37 upwardly, causing the dog 51 to raise the end of the lever 57, thus unlocking the merchandise releasing mechanism.

The bin 45 is adapted to contain the merchandise to be vended which, for example, may be said to consist of balls of gum such as indicated at 63. The floor 64 of the bin is dished as clearly indicated in Fig. 8 so that said balls may readily roll to a central opening 65 in said floor for passage therethrough. Beneath the bin 45 and adapted to slide laterally thereof in suitable guides 66, is a trap device 70 consisting of two downwardly extending measuring tubes or chutes 67 and 68 disposed parallelly with the guides 66. The tube 67 is provided with a horizontally disposed slit 71, and the tube 68 is likewise provided with a similar horizontally disposed slit 72 in alignment with the slit 71, both slits extending inwardly from the outer circumference of the tubes to beyond the vertical plane passing through the axes of said tubes as clearly indicated in Fig. 3. A bracket construction 73, supporting the bin 45 has secured thereto a plate 74 angularly bent to provide a horizontally disposed section 75 adapted to lie within the slit 71 when the trap or measuring member 70 is slid in its guides 66 to the position shown in Fig. 8. The bracket 73 likewise has secured thereto another plate, not shown, but exactly similar to the plate 74 and provided with a horizontally disposed portion 76 similar to the portion 75 of the plate 74, the portion 76 so disposed that it will lie within the slit 72 of the tube 68 when the trap member 70 is moved from the position shown in Fig. 8 toward the right in its guides 66. The horizontal portions 75 and 76 are therefore spaced from each other so that when the trap member 70 is in the position shown in Fig. 8 the balls 63 of gum may drop down through the tube 68 to the bottom thereof and beyond the slit 72. In this connection it should be stated that the vertical distance from the bottom of each tube to its associated slit, is equal to the combined diametrical dimension of the number of balls of gum desired vended for one coin, (shown in Figure 8 as one ball).

Likewise secured to the bin supporting bracket shown at 73 in Fig. 3, is another plate 77 angularly bent to provide a horizontally disposed portion 78 adapted to extend under and in close proximity to the lowermost edge of the tubes 67 and 68. This portion 78 is of such a length, and has its opposite sides so scooped as at 80 and 81, that when the trap member 70 is moved to the position shown in Fig. 8, a ball of gum such as indicated at 82 may drop from its lowermost position in the tube 67 into a trough 83 disposed beneath the trap member, and roll from said trough through a chute 84 to the cup or pocket 85 from which the operator of the machine may gather the same. It is to be observed that when the ball 82 leaves the trap member the plate 75 lying within the slot 71 will prevent any other ball such as 86 from leaving the tube 67, by forming an obstruction across said tube to support said ball 86, the tube 67 being of sufficient length to easily accommodate two balls below the floor 64. When the trap member 70 is subsequently moved to the right from the position shown in Fig. 8 it will thus be evident that the horizontal plate 76 will enter the slit 72 in the tube 68 forcing the ball of gum 63 slightly upwards so that it will eventually rest upon said plate 76 when the tube 68 reaches the dotted line position thereof, thus permitting the ball 87 to fall from its position in the lowermost end of said tube 68 into the trough 83, to subsequently roll through the delivery chute 84 to the delivery pocket 85. Thus it will be seen that in the intermittent lateral movements of the trap member 70, the balls of gum are allowed to drop alternately from the tubes 67 and 68 and that the balls above the lowermost ball in each of said tubes are prevented from taking the place of the ball just discharged from one of said tubes by the plates 75 and 76. But upon the next movement of the trap member 70, such as to the right as seen in Fig. 8, it will be evident that, as the tube 67 so moves, it will leave the stationary plate 75 so that the ball of gum 86 supported by said plate will be permitted to drop into the lower portion of said tube but not released therefrom due to the fact that during said movement to the right of the tube 67, said tube will ride over the lower plate 78 so that the ball of gum 86, when the trap member reaches the limit of its right hand movement will occupy a position similar to the position of the ball 87 shown in said figure.

The operating or releasing mechanism comprises a knob 90 disposed outside the cabinet associated with a suitable plate 91, (giving for example information as to the direction of rotation of the knob) which is secured in any suitable manner to the front wall 1 of the cabinet and which provides a bearing for the shaft 92 to the front end of which is rigidly secured said knob 90. On the inside of the cabinet and attached to the front wall 1 thereof is a plate 93 carrying a pin 94 for pivotally supporting a pawl 95 adapted to coact with a ratchet 96 rigidly secured as at 97 to the shaft 92, said pawl adapted to prevent reverse movement of the shaft 92, or stated in other words, to insure rotation of said shaft 92 in one direction only. The inner end of the shaft 92 passes through a bracket 98 supporting the merchandise bin 45 and has rigidly secured at the end thereof a cam 100 to the end of which is pivoted as at 101 the end of a connecting link 102, the other end of which is pivoted as at 103 to the lower extremity of a bracket 104 depending from the trap member 70, see Figs. 3 and 8. Thus it will be seen that as the knob 90 is turned, the shaft 92 will be caused to rotate which in turn will rotate the cam 100 rigidly secured thereto, and this in turn will move the connecting link 102 to cause a reciprocation of the trap member 70 in its guides 66. However, it is desired to move the trap member 70 in one direction only upon the insertion of a single coin, and therefore means are provided for causing a stoppage of said trap member in its limit of travel in either direction.

This means is illustrated in Figs. 2, 6 and 7 and comprises a hub 105 rigidly secured to the shaft 92 adjacent the bracket 98, said hub provided with oppositely extending spokes 106 and 107 of equal length so disposed relative to the hub that the surface 108 of the one and the surface 109 of the other lie in a diametric plane of the said hub. In other words, there is exactly 180 degrees of measurement from the surface 108 to the surface 109. The releasing lever 61 is provided with an angularly disposed extension 112 provided with an arcuate cam surface 113 at its extreme end which is adapted to be swiped by the extreme end of the spokes 106 and 107. The other free end of the releasing lever 61 has a lug 114 providing a shoulder 115 against which the surfaces 108 and 109 are adapted to contact to prevent further rotation of the shaft 92. Beyond the lug 114 is a second lug 116 having a corner 117 adapted to rest within the angle 118 formed by a shoulder substantially midway of the locking lever 57. A stop 119 formed on the bracket member 98 prevents movement of the lever 61 toward the left from its position as seen in Fig. 7.

The above descriptions have been directed to the apparatus as disclosed in Figures 1 to 12 where, upon the insertion of a single coin, the parts are so adjusted as to permit a half revolution of the shaft 92 and therefore a single reciprocation of the measuring member 70. Also the parts have been so described as calling for the two plates 75 and 76 cooperating with the slots therefor in the measuring member so that as said measuring member is reciprocated, but one ball of gum will be be released to the operator of the mahcine for each coin insertion.

In Figures 13, 14 and 15 is illustrated the same construction with a different adjustment so that various numbers of articles of merchandise can be discharged from the mechanism for each coin inserted. Referring more particularly to Fig. 13, which is a vertical view taken as on the line 8—8 of Fig. 3 but looking in the opposition direction from the arrows, it will be seen that the plate 75 is still employed, but that the plate 76 has been removed. Stated in other words, the plates 75 and 76 are independently secured to one of the supporting legs of the merchandise bin 45 so that one or both may be removed. In this particular figure only one has been removed and as a result thereof it will be seen that two balls of gum will be permitted to fall from the measuring tube 67 when the same has passed to the left and cleared the left hand end of the lower retaining plate 78 which is likewise secured to the supporting legs of the merchandise bin 45. Fig. 13 shows the two balls of gum still supported by the lower plate 78, and Fig. 14 shows the measuring member having moved to its extreme limit of movement to the left thus allowing the two balls of gum to drop into the trough 83 from which they may roll to the cup 85 from which the operator of the machine may gather them.

Thus it will be seen that when both plates 75 and 76 are employed, there will be discharged, for each coin inserted, only one ball of gum for each oscillation of the measuring member. On the other hand, with one of these plates removed, two balls of gum will be permitted to fall from one of the measuring tubes as will be apparent from Figs. 13 and 14, but only one ball of gum will be discharged from the other measuring tube such as 68 when the measuring member is moved in the opposite direction, because the division plate 75 will come into operation to retain the ball of gum 86 thereabove. Stated in other words, when either the plate 75 or the plate 76 is removed, there will be given alternately one ball of gum or two balls of gum upon the insertion of each coin.

From Figs. 13 and 14, it will likewise be obvious that if both plates 75 and 76 are removed, then two balls of gum will be delivered upon the insertion of each coin.

Fig. 15 discloses a modified form of the hub 105 carrying the spokes 106 and 107 for actuating the cams 113 and 115, see Fig. 7, associated with the releasing lever 61. That is to say, with particular reference to Figs. 6 and 7 it will be seen that the spokes 106 and 107 are in the same transverse plane of the hub 105, but that in Fig. 15 the spokes have been placed in different transverse planes. The purpose of this is so that the shaft 92, after the insertion of a coin, may be rotated either one half turn or a full turn as desired by the owner of the machine. To accomplish this desired result, the hub 105 is provided with a hole 130 adapted to receive a suitable pin 131 for the purpose of locking the hub to the shaft 92. That is to say, there is a hole provided in the shaft 92 to register with the hole 130 of the hub 105 so that when the pin 131 is placed through both of these registering holes, the hub 105 will be disposed in the position shown in Fig. 15 whereupon both spokes 106 and 107 will coact with the lug 114 carried by the releasing lever 61 because the lug 114 extends outwardly from said lever to intercept both spokes. Therefore in this position it will be obvious that the shaft 92 will be permitted only one half turn for each coin inserted.

When a complete revolution of the shaft 92 for each coin inserted is desired then the pin 131 is removed and the hub 105 moved axially of the shaft until the hole 130 registers with a second hole 132 provided in the shaft and which is spaced from the other hole a distance sufficient so that when the hub is secured by passing its pin 131 through the hole 132 in the shaft, the spoke 107 will lie in a transverse plane beyond the end of the lug 114. In other words, the spokes and the hub will be moved axially of the shaft 92 and secured in adjusted position by the pin 131 so that only the spoke 106 will coact with the lug 114, the other spoke 107 being free to pass by the end of the lug 114 without performing any work. In a similar manner, the cam surface 113 will be made of sufficient dimensions so that the spoke 107 will likewise pass by said cam surface without performing any work thereon when the hub 105 is in its adjusted position to allow the full revolution of the shaft 92 for each coin inserted.

Heretofore, from the description, various results have been obtained in the number of articles discharged, but these various numbers were made possible only by a change in the number of plates (75 and 76) allowed to coact with the measuring tubes of the device. That is to say, these results were obtained with the aforementioned half revolution of the shaft 92. When a full revolution of the said shaft is permitted by the number of spokes 106 and 107 axially of said shaft, then it will be obvious that with the use of both plates 75 and 76, the measuring bin will be permitted a double reciprocation for each coin inserted and therefore two balls of gum will be discharged. With the same full revolution of the shaft 92, but one of the plates such as 76 removed then it will be obvious from the foregoing that three balls of gum will be discharged in the cycle of operation. Likewise when both plates 75 and 76 are removed, then a full revolution of the shaft 92 will permit four balls of gum to be discharged from the device for each coin inserted. In all of these various adjustments, it is to be observed with particular reference to Figs. 8, 13 and 14, that the bottom or floor of the magazine or bin 45 is provided with the opening 65 of such dimension that there is left a portion 135 adapted to prevent balls of gum or other merchandise from entering the measuring tube 68 when said tube is moved to a position thereunder, and a similar portion 136 adapted to cut off the flow of articles to the other measuring tube 67 when it is moved to a position under said portion 136.

The operation of the releasing mechanism is as follows. After the machine has delivered an article of merchandise one of the surfaces 108 or 109 is contacting with the under side 115 of the lug 114 carried by the releasing lever 61, and the lug 116 of said lever is resting within the angle 118 of the locking lever 57, the spring 60 holding the releasing and locking levers in this position. Upon the insertion of a subsequent coin and the depression of the plunger 7 as heretofore described, the connecting link 37 will move downwardly as seen in Fig. 3, the dog 51 will pass to a position beneath the locking lever 57 and after the plunger 7 has been returned to its normal raised position by its control spring 23, the heavy duty spring 46 will cause the said connecting link 37 to move upwardly, and in this action the toe 56 of the dog 51 will lift the end of the locking lever 57. When this occurs the lug 116 will slip out of the angle 118 of the locking lever, due to the action of the spring 60, or into the position shown in Fig. 7, this action being made possible by the length of the toe 56 of the dog 51 which does not leave or pass from under the lever 57 until after the lug 116 leaves the angle 118. The locking and the releasing levers 57 and 61 are then in the position shown in Fig. 7. The size of the lug 116 carried by the latter and the length of the spokes 106 and 107 are such that at this time the extremity of either spoke may pass the lug 114 upon rotation of the shaft 92. As above described the rotation of this shaft 92 causes the trap member 70 to move so as to release the desired number of balls of gum or other merchandise and deliver the same to the operator of the machine. Upon the continued rotation of the shaft 92 the opposite spoke such as 107 will move so that its end contacts with the arcuate cam surface 113 of the extension 112 of the releasing lever 61, and upon continued rotation of said shaft the spoke 107 will cause the extension 112 to move downwardly, or in other words, will cause the releasing lever 61 to oscillate about its pivot 62 thus moving the lugs 114 and 116 toward the right as seen in Fig. 7. The cam surface 113 is of sufficient length that when the spoke 107 is about to leave the same, the corner 117 of the lug 116 will have moved far enough so that the spring 60 will cause the locking lever 57 to move downwardly oscillating about its pivot 58 to seat said corner 117 in the angle 118. The lever 57 is limited in its downward movement likewise by the stop 119, and the side of the angle 118 is such as to retain the lug 116 therein. At this time the lug 114 will have moved with the lever 61 sufficiently toward the right so that the lower surface 115 thereof will engage the surface 109 of, and thus stop, the advancing spoke 107. The parts will then be locked, the pawl 95 preventing any reverse rotation of the shaft 92, the normal rotation of which is indicated by an arrow in the several figures of the drawings.

It is obvious that those skilled in the art may vary the details of construction as well as the arrangements of parts without departing from the spirit of the invention, therefore it is not desired to be limited to the foregoing disclosure except as may be required by the claims.

What is claimed is:—

1. In a vending device of the character described the combination of a receptacle for merchandise; a measuring member for said merchandise; means passing through said member to measure the quantity of merchandise to be vended; an operating shaft and connections for moving said member to discharge the measured merchandise; means to stop the rotation of said shaft; means to lock said last named means; and coin controlled means to move said locking means whereby said shaft may be rotated.

2. In a vending device of the character described the combination of a receptacle for merchandise; a measuring member constituting a movable bottom for the receptacle for said merchandise; stationary means passing through said member to measure the quantity of merchandise to be vended; an operating shaft and connections for moving said member to discharge the measured merchandise; means to stop the rotation of said shaft; means to lock said last named means; and coin controlled means to move said locking means whereby said shaft may be rotated.

3. In a vending device of the character described the combination of a receptacle for merchandise; a reciprocating measuring member for said merchandise; means passing through said member to measure the quantity of merchandise to be vended; a rotatable operating shaft and connections for moving said member to discharge the measured merchandise; means to stop the rotation of said shaft; means to lock said last named means; and coin controlled means to move said locking means whereby said shaft may be rotated.

4. In a vending device of the character described the combination of a receptacle for merchandise; an apertured measuring member for said merchandise; stationary means passing through the aperture of said member to measure the quantity of merchandise to be vended; an operating shaft and connections for moving said member to discharge the measured merchandise; means to stop the rotation of said shaft; means to lock said last named means; and coin controlled means to move said locking means whereby said shaft may be rotated.

5. In a vending device of the character described the combination of a receptacle for merchandise; a measuring member for said merchandise having a transversely disposed slot therein; means coacting with said slot and passing through said member to measure the quantity of merchandise to be vended; an operating shaft and connections for moving said member out of engagement with said last named means to discharge the measured merchandise; means to stop the rotation of said shaft; means to lock said last named means; and coin controlled means to move said locking means whereby said shaft may be rotated.

6. In a vending device of the character described the combination of a receptacle for merchandise; a tubular measuring member for said merchandise; means comprising a plate passing through said member to measure the quantity of merchandise to be vended; an operating shaft and connections for moving said member to discharge the measured merchandise; means controlled by said shaft to stop the rotation of said shaft; means to lock said last named means; and coin controlled means to move said locking and stop means whereby said shaft may be rotated.

7. In a vending device of the character described the combination of a receptacle for merchandise; a reciprocating measuring member for said merchandise; means passing through said member to measure the quantity of merchandise to be vended; an operating shaft and connections for reciprocating said member to discharge the measured merchandise; means to stop the rotation of said shaft at the end of each reciprocation of said member; means to lock said last named means; and coin controlled means to move said locking means whereby said shaft may be rotated.

8. In a vending device of the character described the combination of a receptacle for merchandise; a measuring member for said merchandise; means passing through said member to measure the quantity of merchandise to be vended; an operating shaft and connections for moving said member to discharge the measured merchandise; pivoted spring controlled means to stop the rotation of said shaft; shaft actuated means to lock said last named means; and coin controlled means to move said locking means whereby said shaft may be rotated.

9. In a vending device of the character described the combination of a receptacle for merchandise; a measuring member for said merchandise; means passing through said member to measure the quantity of merchandise to be vended; an operating shaft and connections for moving said member to discharge the measured merchandise; pivoted shaft actuated means to stop the rotation of said shaft; pivoted spring controlled means to lock said last named means; and coin controlled means to move said locking means whereby said shaft may be rotated.

10. In a vending device of the character described the combination of a receptacle for merchandise; a measuring member for said merchandise; means passing through said member to measure the quantity of merchandise to be vended; an operating shaft and connections for moving said member to discharge the measured merchandise; means comprising a lever provided with a lug to stop the rotation of said shaft; means comprising a lever provided with a shoulder to lock said last named means; and coin controlled means to move said locking means whereby said shaft may be rotated.

11. In a vending device of the character described the combination of a receptacle for merchandise; a measuring member for said merchandise; means passing through said member to measure the quantity of merchandise to be vended; an operating shaft and connections for moving said member to discharge the measured merchandise; means comprising a lever provided with a lug to stop the rotation of said shaft; means comprising a lever joined to said stop lever and provided with a shoulder to lock said last named means; and coin controlled means to move said locking means whereby said shaft may be rotated.

12. In a vending device for articles of merchandise the combination of means to receive the articles from a magazine therefor; means to control the number of articles released from said receiving means; a rotatable shaft and connections for moving said receiving means to discharge said articles; means to stop said shaft in predetermined positions; means to lock said last named means; and coin controlled means to release said locking means whereby said shaft may be rotated.

13. In a vending device for articles of merchandise the combination of reciprocable means to receive the articles from a magazine therefor; a plurality of means to control the number of articles released from said receiving means; a rotatable shaft and connections for reciprocating said receiving means to discharge said articles; means to stop said shaft in predetermined positions; means to lock said last named means; and coin controlled means to release said locking means whereby said shaft may be rotated.

14. In a vending device for articles of merchandise the combination of means to receive the articles from a magazine therefor; a plurality of independent means to control the number of articles released from said receiving means; a rotatable shaft and connections for moving said receiving means to discharge said articles; means to stop said shaft in predetermined positions; means to lock said last named means; and coin controlled means to release said locking means whereby said shaft may be rotated.

15. In a vending device for articles of merchandise the combination of reciprocable means to receive the articles from a magazine therefor; a plurality of independent means to control the number of articles released from said receiving means whereby the same number of articles will be released therefrom upon each reciprocation thereof; a rotatable shaft and connections for moving said receiving means to discharge said articles; means to stop said shaft in predetermined positions; means to lock said last named means; and coin controlled means to release said locking means whereby said shaft may be rotated.

16. In a vending device for articles of merchandise the combination of reciprocable means to receive the articles from a magazine therefor; a plurality of independent means to control the number of articles released from said receiving means whereby the number of articles released therefrom on any reciprocation thereof will be different from the number of articles released on the preceding reciprocation; a rotatable shaft and connections for moving said receiving means to discharge said articles; means to stop said shaft in predetermined positions; means to lock said last named means; and coin controlled means to release said locking means whereby said shaft may be rotated.

17. In a vending device for articles of merchandise the combination of means to receive the articles from a magazine therefor; a plurality of stationary independent means to control the number of articles released from said receiving means; a rotatable shaft and connections for moving said receiving means to discharge said articles; means to stop said shaft in predetermined positions; means to lock said last named means; and coin controlled means to release said locking means whereby said shaft may be rotated.

18. In a vending device for articles of merchandise the combination of means to receive the articles from a magazine therefor; stationary and rotatable means to control the number of articles released from said receiving means; a rotatable shaft and connections for moving said receiving means to discharge said articles; means to stop said shaft in predetermined positions; means to lock said last named means; and coin controlled means to release said locking means whereby said shaft may be rotated.

19. In a vending device for articles of merchandise the combination of means to receive the articles from a magazine therefor; slidably adjustable rotatable means to control the number of articles released from said receiving means; a rotatable shaft and connections for moving said receiving means to discharge said articles; means to stop said shaft in predetermined positions; means to lock said last named means; and coin controlled means to release said locking means whereby said shaft may be rotated.

20. In a vending device for articles of merchandise the combination of means to receive the articles from a magazine therefor; a plurality of means comprising independent stationary members as well as slidably adjustable rotatable members to control the number of articles released from said receiving means; a rotatable shaft and connections for moving said receiving means to discharge said articles; means to stop said shaft in predetermined positions; means to lock said last named means; and coin controlled means to release said locking means whereby said shaft may be rotated.

In testimony whereof I affix my signature.

HARRY W. BARSON.